(12) United States Patent
Stevenson et al.

(10) Patent No.: US 9,617,354 B2
(45) Date of Patent: Apr. 11, 2017

(54) ELECTROINITIATED POLYMERIZATION OF COMPOSITIONS HAVING A 1,1-DISUBSTITUTED ALKENE COMPOUND

(71) Applicant: Sirrus, Inc., Loveland, OH (US)

(72) Inventors: Peter Rulon Stevenson, Loveland, OH (US); Jeffrey M. Sullivan, Goshen, OH (US)

(73) Assignee: Sirrus, Inc., Loveland, OH (US)

( * ) Notice: Subject to any disclaimer, the term of this patent is extended or adjusted under 35 U.S.C. 154(b) by 0 days.

(21) Appl. No.: 14/948,734

(22) Filed: Nov. 23, 2015

(65) Prior Publication Data
US 2016/0347871 A1 Dec. 1, 2016

Related U.S. Application Data

(63) Continuation of application No. 14/727,285, filed on Jun. 1, 2015, now Pat. No. 9,217,098.

(51) Int. Cl.
| | | |
|---|---|---|
| C08G 63/48 | (2006.01) | |
| C08F 2/00 | (2006.01) | |
| C08F 118/02 | (2006.01) | |
| C08F 2/58 | (2006.01) | |
| C08F 2/38 | (2006.01) | |
| C08F 2/44 | (2006.01) | |
| C08L 35/02 | (2006.01) | |
| C08K 3/04 | (2006.01) | |
| C09J 4/00 | (2006.01) | |

(52) U.S. Cl.
CPC .......... *C08F 2/58* (2013.01); *C08F 2/38* (2013.01); *C08F 2/44* (2013.01); *C08K 3/04* (2013.01); *C08L 35/02* (2013.01); *C09J 4/00* (2013.01)

(58) Field of Classification Search
CPC ............ C08K 5/42; C08F 2/58; C08F 283/14
USPC ................... 526/236, 319; 525/10
See application file for complete search history.

(56) References Cited

U.S. PATENT DOCUMENTS

| | | |
|---|---|---|
| 2,212,506 A | 8/1940 | Bachman et al. |
| 2,245,567 A | 6/1941 | Brant et al. |
| 2,277,479 A | 3/1942 | D'Alelio |
| 2,313,501 A | 3/1943 | Bachman et al. |
| 2,330,033 A | 9/1943 | D'Alelio |
| 2,403,791 A | 7/1946 | D'Alelio |
| 2,726,204 A | 12/1955 | Kilbourne et al. |
| 2,730,457 A | 1/1956 | Green et al. |
| 3,042,710 A | 7/1962 | Dickstein et al. |
| 3,140,276 A | 7/1964 | Forster |
| 3,197,318 A | 7/1965 | Halpern et al. |
| 3,203,915 A | 8/1965 | D'Alelio |
| 3,221,745 A | 12/1965 | Coover, Jr. et al. |
| 3,385,777 A | 5/1968 | Haycock et al. |
| 3,427,250 A | 2/1969 | Haas et al. |
| 3,489,663 A | 1/1970 | Bayer et al. |
| 3,523,097 A | 8/1970 | Coover, Jr. et al. |
| 3,557,185 A | 1/1971 | Ito et al. |
| 3,591,676 A | 7/1971 | Hawkins et al. |
| 3,595,869 A | 7/1971 | Shuman |
| 3,677,989 A | 7/1972 | Jenkinson |
| 3,728,373 A | 4/1973 | Imohel et al. |
| 3,758,550 A | 9/1973 | Eck et al. |
| 3,759,797 A | 9/1973 | Masunaga et al. |
| 3,923,836 A | 12/1975 | Bender et al. |
| 3,936,486 A | 2/1976 | Egger et al. |
| 3,940,362 A | 2/1976 | Overhults |
| 3,945,891 A | 3/1976 | Aal et al. |
| 3,966,562 A | 6/1976 | Mukushi et al. |
| 3,975,422 A | 8/1976 | Buck |
| 3,978,422 A | 8/1976 | Rheinfelder |
| 3,995,489 A | 12/1976 | Smith et al. |
| 4,001,345 A | 1/1977 | Gorton et al. |
| 4,004,984 A | 1/1977 | Margen |
| 4,018,656 A | 4/1977 | Rogers et al. |
| 4,035,243 A | 7/1977 | Katz et al. |
| 4,036,985 A | 7/1977 | Amato et al. |
| 4,046,943 A | 9/1977 | Smith et al. |
| 4,049,698 A | 9/1977 | Hawkins et al. |
| 4,056,543 A | 11/1977 | Ponticello |
| 4,079,058 A | 3/1978 | Ackermann et al. |
| 4,080,238 A | 3/1978 | Wolinski et al. |
| 4,083,751 A | 4/1978 | Choi et al. |
| 4,102,809 A | 7/1978 | Smith et al. |
| 4,105,688 A | 8/1978 | Arni et al. |
| 4,118,422 A | 10/1978 | Klein |
| 4,140,584 A | 2/1979 | Margen |

(Continued)

FOREIGN PATENT DOCUMENTS

| | | |
|---|---|---|
| CN | 102901754 A | 1/2013 |
| DE | 19508049 A1 | 9/1996 |
| FR | 2788516 A1 | 7/2000 |
| GB | 432628 | 7/1935 |
| GB | 965676 | 8/1964 |
| GB | 965767 | 8/1964 |
| GB | 975733 | 11/1964 |
| JP | 02-281013 | 11/1990 |
| JP | H108231564 | 9/1996 |
| JP | 09258448 A | 10/1997 |

(Continued)

OTHER PUBLICATIONS

M. McCoy, "A New Way to Stick" Chemical & Engineering News, vol. 26, Issue 26 (Jun. 30, 2014), pp. 17-18.

(Continued)

*Primary Examiner* — William Cheung
(74) *Attorney, Agent, or Firm* — Ulmer & Berne, LLP

(57) ABSTRACT

Electropolymerizable compositions are disclosed. Certain electropolymerizable compositions include one or more 1,1-disubstituted alkene compounds and one or more conductive synergists. Other certain electropolymerizable compositions include one or more 1,1-disubstituted alkene compounds and one or more acid stabilizers and one or more free radical stabilizers.

19 Claims, No Drawings

(56) References Cited

U.S. PATENT DOCUMENTS

| | | | |
|---|---|---|---|
| 4,148,693 A | 4/1979 | Williamson |
| 4,154,914 A | 5/1979 | Kuraya |
| 4,160,864 A | 7/1979 | Ponticello et al. |
| 4,176,012 A | 11/1979 | Bryant |
| 4,186,058 A | 1/1980 | Katz et al. |
| 4,186,060 A | 1/1980 | Katz et al. |
| 4,198,334 A | 4/1980 | Rasberger |
| 4,224,112 A | 9/1980 | Childs |
| 4,229,263 A | 10/1980 | Childs |
| 4,236,975 A | 12/1980 | Childs |
| 4,237,297 A | 12/1980 | Rody et al. |
| 4,243,493 A | 1/1981 | Gruber et al. |
| 4,256,908 A | 3/1981 | Nishimura et al. |
| 4,282,067 A | 8/1981 | Katz et al. |
| 4,282,071 A | 8/1981 | Sherrod |
| 4,291,171 A | 9/1981 | Baum et al. |
| 4,313,865 A | 2/1982 | Teramoto et al. |
| 4,319,964 A | 3/1982 | Katz et al. |
| 4,329,479 A | 5/1982 | Yabutani et al. |
| 4,396,039 A | 8/1983 | Klenk et al. |
| 4,399,300 A | 8/1983 | Prange et al. |
| 4,411,740 A | 10/1983 | Flaningam et al. |
| 4,440,601 A | 4/1984 | Katz et al. |
| 4,440,910 A | 4/1984 | O'Connor |
| 4,443,624 A | 4/1984 | Prange et al. |
| 4,444,928 A | 4/1984 | Karrer |
| 4,450,067 A | 5/1984 | Angevine et al. |
| 4,504,658 A | 3/1985 | Narisada et al. |
| 4,510,273 A | 4/1985 | Miura et al. |
| 4,517,105 A | 5/1985 | Laemmle et al. |
| 4,539,423 A | 9/1985 | Itatani et al. |
| 4,556,649 A | 12/1985 | Salzburg et al. |
| 4,560,723 A | 12/1985 | Millet et al. |
| 4,578,503 A | 3/1986 | Ishikawa et al. |
| 4,584,064 A | 4/1986 | Ciais et al. |
| 4,613,658 A | 9/1986 | Mathias et al. |
| 4,698,333 A | 10/1987 | Fauss et al. |
| 4,720,543 A | 1/1988 | McPherson et al. |
| 4,724,053 A | 2/1988 | Jasne |
| 4,727,801 A | 3/1988 | Yokoi et al. |
| 4,728,701 A | 3/1988 | Jarvis et al. |
| 4,736,056 A | 4/1988 | Smith et al. |
| 4,767,503 A | 8/1988 | Crescentini et al. |
| 4,769,464 A | 9/1988 | Sajtos |
| 4,783,242 A | 11/1988 | Robbins |
| 4,828,882 A | 5/1989 | Tsezos et al. |
| 4,835,153 A | 5/1989 | Kubota et al. |
| 4,840,949 A | 6/1989 | Korbonits et al. |
| 4,897,473 A | 1/1990 | Dombek |
| 4,914,226 A | 4/1990 | Di Trapani et al. |
| 4,931,584 A | 6/1990 | Bru-Magniez et al. |
| 4,932,584 A | 6/1990 | Yamazaki et al. |
| 5,021,486 A | 6/1991 | Galbo |
| 5,039,720 A | 8/1991 | Saatweber et al. |
| 5,064,507 A | 11/1991 | O'Donnell et al. |
| 5,142,098 A | 8/1992 | Bru-Magniez et al. |
| 5,162,545 A | 11/1992 | Etzbach et al. |
| 5,210,222 A | 5/1993 | O'Murchu |
| 5,227,027 A | 7/1993 | Topper |
| 5,259,835 A | 11/1993 | Clark et al. |
| 5,284,987 A | 2/1994 | Sikkenga et al. |
| 5,292,937 A | 3/1994 | Manning et al. |
| 5,312,864 A | 5/1994 | Wenz et al. |
| 5,328,687 A | 7/1994 | Leung et al. |
| 5,334,747 A | 8/1994 | Steffen |
| 5,397,812 A | 3/1995 | Usami et al. |
| 5,426,203 A | 6/1995 | Sohn et al. |
| 5,446,195 A | 8/1995 | Pacifici |
| 5,514,371 A | 5/1996 | Leung et al. |
| 5,514,372 A | 5/1996 | Leung et al. |
| 5,550,172 A | 8/1996 | Regula et al. |
| 5,565,525 A | 10/1996 | Morimoto et al. |
| 5,567,761 A | 10/1996 | Song |
| 5,575,997 A | 11/1996 | Leung et al. |
| 5,582,834 A | 12/1996 | Leung et al. |
| 5,624,669 A | 4/1997 | Leung et al. |
| 5,693,621 A | 12/1997 | Toepfer et al. |
| 5,817,742 A | 10/1998 | Toepfer et al. |
| 5,817,870 A | 10/1998 | Haas et al. |
| 5,886,219 A | 3/1999 | Steffen |
| 5,902,896 A | 5/1999 | Bauer |
| 5,952,407 A | 9/1999 | Rasoul et al. |
| 6,057,402 A | 5/2000 | Zhou et al. |
| 6,069,261 A | 5/2000 | Hoffmann et al. |
| 6,106,807 A | 8/2000 | Albayrak et al. |
| 6,143,352 A | 11/2000 | Clark et al. |
| 6,183,593 B1 | 2/2001 | Narang et al. |
| 6,210,474 B1 | 4/2001 | Romano, Jr. et al. |
| 6,211,273 B1 | 4/2001 | Bru-Magniez et al. |
| 6,225,038 B1 | 5/2001 | Smith et al. |
| 6,238,896 B1 | 5/2001 | Ozaki et al. |
| 6,245,933 B1 | 6/2001 | Malofsky et al. |
| 6,284,915 B2 | 9/2001 | Hirase et al. |
| 6,291,703 B1 | 9/2001 | Schaerfl, Jr. et al. |
| 6,376,019 B1 | 4/2002 | Leung |
| 6,395,737 B1 | 5/2002 | Defossa et al. |
| 6,395,931 B1 | 5/2002 | Carvalho et al. |
| 6,413,415 B1 | 7/2002 | Weiss et al. |
| 6,420,468 B2 | 7/2002 | Bru-Magniez et al. |
| 6,440,461 B1 | 8/2002 | Bru-Magniez et al. |
| 6,512,023 B1 | 1/2003 | Malofsky et al. |
| 6,518,677 B1 | 2/2003 | Capote et al. |
| 6,545,097 B2 | 4/2003 | Pinchuk et al. |
| 6,559,264 B1 | 5/2003 | Konig et al. |
| 6,610,078 B1 | 8/2003 | Bru-Magniez et al. |
| 6,613,934 B1 | 9/2003 | Jegelka et al. |
| 6,673,957 B2 | 1/2004 | Bartek et al. |
| 6,699,928 B2 | 3/2004 | Cobbley et al. |
| 6,716,355 B1 | 4/2004 | Hanemaaijer et al. |
| 6,750,298 B1 | 6/2004 | Bru-Magniez et al. |
| 6,794,365 B2 | 9/2004 | Al-Obeidi et al. |
| 6,841,064 B1 | 1/2005 | Weiss et al. |
| 6,936,140 B2 | 8/2005 | Paxton et al. |
| 7,070,675 B2 | 7/2006 | Schmidt et al. |
| 7,109,369 B2 | 9/2006 | Nose et al. |
| 7,169,727 B2 | 1/2007 | Thorman |
| 7,208,621 B2 | 4/2007 | Nose et al. |
| 7,226,957 B1 | 6/2007 | Scranton et al. |
| 7,305,850 B2 | 12/2007 | Tonkovich et al. |
| 7,450,290 B2 | 11/2008 | Xu et al. |
| 7,553,989 B2 | 6/2009 | Sawabe et al. |
| 7,603,889 B2 | 10/2009 | Cypes et al. |
| 7,610,775 B2 | 11/2009 | Tonkovich et al. |
| 7,649,108 B2 | 1/2010 | Schal et al. |
| 7,659,423 B1 | 2/2010 | McArdle |
| 7,663,000 B2 | 2/2010 | Dekkers et al. |
| 7,678,847 B2 | 3/2010 | Yan et al. |
| 7,771,567 B2 | 8/2010 | Rives et al. |
| 7,900,558 B2 | 3/2011 | Yokoi |
| 8,119,214 B2 | 2/2012 | Schwantes et al. |
| 8,206,570 B2 | 6/2012 | Deniau |
| 8,318,060 B2 | 11/2012 | Sundberg et al. |
| 8,609,885 B2 | 12/2013 | Malofsky et al. |
| 8,884,051 B2 | 11/2014 | Malofsky et al. |
| 9,108,914 B1 | 8/2015 | Malofsky et al. |
| 9,181,365 B2 | 11/2015 | Malofsky et al. |
| 9,217,098 B1 | 12/2015 | Stevenson et al. |
| 9,221,739 B2 | 12/2015 | Malofsky et al. |
| 9,234,107 B2 | 1/2016 | Malofsky et al. |
| 9,334,430 B1 | 5/2016 | Stevenson et al. |
| 2001/0005572 A1 | 6/2001 | Lobo et al. |
| 2001/0034300 A1 | 10/2001 | Yurugi et al. |
| 2002/0143128 A1 | 10/2002 | Cabioch et al. |
| 2002/0151629 A1 | 10/2002 | Buffkin et al. |
| 2003/0096069 A1 | 5/2003 | D'Alessio |
| 2003/0199655 A1 | 10/2003 | Yurugi et al. |
| 2004/0076601 A1 | 4/2004 | Bru-Magniez et al. |
| 2004/0082043 A1 | 4/2004 | Yadav et al. |
| 2004/0086243 A1 | 5/2004 | DiGiovanni et al. |
| 2004/0220060 A1 | 11/2004 | Bartley et al. |
| 2005/0106781 A1 | 5/2005 | Ogata |
| 2006/0001158 A1 | 1/2006 | Matayabas, Jr. et al. |
| 2006/0073334 A1 | 4/2006 | Schwantes et al. |
| 2006/0167267 A1 | 7/2006 | Chorghade et al. |

(56) References Cited

U.S. PATENT DOCUMENTS

| | | |
|---|---|---|
| 2006/0197236 A1 | 9/2006 | Basheer et al. |
| 2006/0211809 A1 | 9/2006 | Kodemura et al. |
| 2007/0043145 A1 | 2/2007 | Beck et al. |
| 2007/0049655 A1 | 3/2007 | Yoshimune et al. |
| 2007/0092483 A1 | 4/2007 | Pollock |
| 2007/0222051 A1 | 9/2007 | Yoshimura et al. |
| 2008/0131618 A1 | 6/2008 | Nakamura et al. |
| 2008/0160305 A1 | 7/2008 | Warren et al. |
| 2008/0187655 A1 | 8/2008 | Markle et al. |
| 2008/0227919 A9 | 9/2008 | Li et al. |
| 2008/0241485 A1 | 10/2008 | Shimohara et al. |
| 2008/0286333 A1 | 11/2008 | Kangas et al. |
| 2009/0087151 A1 | 4/2009 | Benjamin et al. |
| 2009/0200652 A1 | 8/2009 | Oh et al. |
| 2009/0203861 A1 | 8/2009 | Lee et al. |
| 2009/0263604 A1 | 10/2009 | Arai et al. |
| 2009/0286433 A1 | 11/2009 | Watanabe |
| 2010/0016508 A1 | 1/2010 | Sasagawa et al. |
| 2010/0124649 A1 | 5/2010 | Rukavina et al. |
| 2010/0256720 A1 | 10/2010 | Overstreet et al. |
| 2010/0286438 A1 | 11/2010 | Malofsky et al. |
| 2011/0015406 A1 | 1/2011 | Umetani et al. |
| 2011/0024392 A1 | 2/2011 | Sato et al. |
| 2011/0164322 A1 | 7/2011 | Morozumi et al. |
| 2011/0244010 A1 | 10/2011 | Doshi |
| 2011/0255156 A1 | 10/2011 | Jethmalani et al. |
| 2012/0083523 A1 | 4/2012 | Richard et al. |
| 2012/0136130 A1 | 5/2012 | Takashima et al. |
| 2012/0261807 A1 | 10/2012 | Itoh et al. |
| 2013/0281580 A1 | 10/2013 | Malofsky et al. |
| 2013/0303719 A1 | 11/2013 | Malofsky et al. |
| 2014/0058031 A1 | 2/2014 | Overbeek et al. |
| 2014/0173889 A1 | 6/2014 | Johnson et al. |
| 2014/0248485 A1 | 9/2014 | Malofsky et al. |
| 2014/0275400 A1 | 9/2014 | Chen et al. |
| 2014/0288230 A1 | 9/2014 | Malofsky et al. |
| 2014/0329980 A1* | 11/2014 | Malofsky ............. C09J 133/06 526/309 |
| 2015/0056879 A1 | 2/2015 | Malofsky et al. |
| 2015/0104660 A1 | 4/2015 | Malofsky et al. |
| 2015/0148480 A1 | 5/2015 | Ellison et al. |
| 2015/0210894 A1 | 7/2015 | Malofsky et al. |
| 2015/0303122 A1 | 10/2015 | Malofsky et al. |
| 2015/0361283 A1 | 12/2015 | Malofsky et al. |

FOREIGN PATENT DOCUMENTS

| | | |
|---|---|---|
| JP | 200019936 | 7/2000 |
| JP | 2008174494 | 1/2007 |
| WO | 99/46619 | 9/1999 |
| WO | 99/55394 | 11/1999 |
| WO | 2007/120630 | 10/2007 |
| WO | 2010/129068 A1 | 11/2010 |
| WO | 2011/059104 | 12/2011 |
| WO | 2011/161045 | 12/2011 |
| WO | 2012/054616 A2 | 4/2012 |
| WO | 2012/054633 A2 | 4/2012 |
| WO | 2013059473 A2 | 4/2013 |
| WO | 2013/066629 | 5/2013 |
| WO | 2013/149173 A1 | 10/2013 |
| WO | 2013149165 A1 | 10/2013 |
| WO | 2013149168 A1 | 10/2013 |

OTHER PUBLICATIONS

International Search Report (ISR) and Written Opinion of the Searching Authority in App No. PCT/US2015/047445 dated as mailed Nov. 30, 2015.
International Search Report (ISR) and Written Opinion of the Searching Authority in App No. PCT/US2015/047466 dated as mailed Dec. 1, 2015.
International Search Report (ISR) and Written Opinion of the Searching Authority in App No. PCT/US2015/048846 dated as mailed Dec. 4, 2015.
European Search Report of the European Patent Office, Issued in European Application No. 13770173.6-1301 / 2831124; dated as mailed on Oct. 9, 2015; 7 pages.
European Search Report of the European Patent Office, Issued in European Application No. 13767993.2-1302 / 2831185; dated as mailed on Jan. 7, 2016; 14 pages.
International Preliminary Report on Patentability in App No. PCT/US2013/070355 dated as issued on May 19, 2015.
M. Ware et al.: "DBU: An Efficient Catalyst for Knoeveganel Condensation under Solvent-free Condition," Bulletin of the Catalysis Society of India, (2007), vol. 6, pp. 104-106.
V. G. Nenajdenko et al.: "Reaction of 2-Methylene-1,3-Dicarbonyl Compounds Containing a CF3-Group with 1,3-Dienes," Tetrahedron, (2000), vol. 56, pp. 6549-6556.
J. S. Yadav et al.: "Phosphane-Catalyzed Knoevenagel Condensation: a Facile Synthesis of a-Cyanoacrylates and a-Cyanoacrylonitriles," Eur. J. Orq. Chem. (2004), pp. 546-551.
B. C. Ranu et al.: "Ionic Liquid as Catalyst and Reaction Medium—a Simple, Efficient and Green Procedure for Knoevenagel Condensation of Aliphatic and Aromatic Carbonyl Compounds Using a Task-Specific Basic Ionic Liquid," Euro. J. Org. Chem., (2006), pp. 3767-3770.
H. A. Oskooie et al.: "On Water: an Efficient Knoevenagel Condensation using 12-Tungstophosphoric Acid as a Reusable Green Catalyst," Synthetic Communications, (2006), vol. 36, pp. 2819-2823.
H. Jiang et al.: "Inorganic Zinc Salts Catalyzed Knoevenagel Condensation at Room Temperature without Solvent," Preparative Biochemistry & Biotechnology, (2009), vol. 39, pp. 194-200.
B. M. Reddy et al.: "An Easy-to-use Heterogeneous Promoted Zirconia Catalyst for Knoevenagel Condensation in liquid Phase under Solvent-Free conditions," Journal of Molecular Catalysis A: Chemical, (2006), vol. 258, pp. 302-307.
D. H. Jung et al.: "New and General Methods for the Synthesis of Arylmethylene Bis(3-Hydroxy-2-Cyclohexene-1-0nes) and Xanthenediones by EDDA and In(OTf)3-Catalyzed One-Pot Domino Knoevenagel/Michael or Koevenagel/Michael/Cyclodehydration Reactions," Bull. Korean Chem. Soc. (2009) vol. 30, No. 9, pp. 1989-1995.
P. Klemarczyk: "Adhesion Studies of Mixtures of Ethyl Cyanoacrylate with a Difunctional Cyanoacrylate Monomer and with other Electron-deficient Olefins," J. Adhesion, (1999), vol. 69, pp. 293-306.
P. Klemarwczyk: "A General Synthesis of 1,1 Disubstituted Electron Deficient Olefins and their Polymer Properties," Polymer, (1998), vol. 39, No. 1, pp. 173-181.
Gill, Charansingh, et al. "Knoevenagel condensation in neutral media: A simple and efficient protocol for the synthesis of electrophillic alkenes catalyzed by anhydrous ferric sulphate with remarkable reusability." Bulletin of the Catalysis Society of India 7 (2008): 153-157.
P. Ballesteros et al.: "DI-tert-Butyl Methylenemalonate [Propanedioic Acid, Methylene-, bis(1, 1-dimethylethyl)ester]," Organic Syntheses. Coil. (1990), vol. 7, p. 142 ; (1986) vol. 64, p. 63.
A. M. Vetrova et al.: "Improvement of the Thermal Stability of Cyanoacrylate Adhesives," Polymer Science, Series D, (2009), vol. 2, No. 1, pp. 27-30.
A. C. Cope: "Condensation Reactions. I. The Condensation of Ketones with Cyanoacetic Esters and the Mechanism of the Knoevenagel Reaction," Condensation of Ketones with Cyanoacetic Esters, (1937), vol. 59, pp. 2327-2330.
G. Lai et al: "Ionic Liquid Functionalized Silica Gel: Novel Catalyst and Fixed Solvent," Tetrahedron Letters (2006), vol. 47, pp. 6951-6953.
J. R. Harjani et al.: "Lewis Acidic Ionic Liquids for the Synthesis of Electrophilic Alkenes via the Knoevenagel Condensation," Tetrahedron Letters, (2002), vol. 43, pp. 1127-1130.
P. Ballesteros et al.: "Synthesis of DI-tert-Butyl Methylenemalonate, a Sterically Hindered 1,1-Dicarbonyl Alkene," J. Org. Chem, (1983), vol. 48, pp. 3603-3605.

(56) References Cited

OTHER PUBLICATIONS

T. Doi et al.: "Synthesis of Dimethyl gloiosiphne A by Way of Palladium-Catalyzed Domino Cyclization," J. Org. Chem., (2007), vol. 72, pp. 3667-3671.
Takagi et al.: Kogyo Kagaku Zasshi, Reaction of Active Methylene Radicals with Formaldehyde. L. Synthesis of Diethyl Methylenemalonate, 1953, 56, pp. 901-903, English abstract.
McNab, Kirk-Othmer Encyclopedia of Chemical Technology, Pyrolysis, Flash Vacuum, 2009, John Wiley & Sons, Inc., pp. 1-26.
Block, "Diethyl bis (hydroxymethyl) malonate" Organic Syntheses, 1973, Coll. vol. 5, p. 381 [vol. 40, p. 27 (1960); Retrieved on Apr. 4, 2014 from internet: http://www.Orgsyn.org/content/pdfs/procedures/cv5p0381.pdf] p. 381, para 1.
Magdalini Matziari et al. "Active methylene phosphinic peptides: a new diversification approach", Organic Letters., vol. 8, No. 11, 2006, pp. 2317-2319, USACS, Washington DC, ISSN: 1523-7060.
Zaragoza Dorwald, Side Reactions in Organic Synthesis, 2005, Wiley-VCH Verlag GmbH & Co., KgaA, Weinheim, Preface. p. IX.
K. Okamura and T. Date, A Facile Conversion of Ethoxydihydropyrans to 4-Cyanoethylisoxazoles, J. Heterocyclic Chem. 33, 383 (1996).
Valentine G. Nenajdenko et al, Reaction of 2-Methylene-1,3-dicarbonyl Compounds Containing a CF3-Group with 1,3-Dienes Tetrahedron 56 (2000) 6549-6556.
Yamauchi et al. "Reactivity of 2-methyene-1,3-dicarbonyl compounds: catalytic enantioselective Diels-Alder reaction", Tetrahedron Asymetry 12, (2001), 3113-3118.
Cristoph Schotes et al. "Cu(I)- and C(II)-Catalyzed Cyclo- and Michael Addition Reactions of Unsaturated [beta]-Ketoesters" The Journal of Organic Chemistry, vol. 76, No. 14 dated Jul. 15, 2011 p. 5862-5866.
Alejandro Bugarin et al. "Efficient direct [alpha]-methylenation of carbonyls mediated by dissopropylammonium trifluoroacetate", Chemical Communications, vol. 46, No. 10 dated Jan. 1, 2010.
H. Hoffman et al. "Preparation and Selected Reaction of tery-Butyl 2-Methylene-3-oxoalkanoates" Chem. Ber., vol. 124 dated Jan. 1, 1991, pp. 2475-2480.
M. Yamauchi et al. "Reactivity of 2-Methylene-1, 3-dicarbonyl Compounds. 1,3-Dipolar Cycloaddition Reaction with Ethyl Diazoacetate", Chem. Pham. Bull., vol. 49, No. 12, dated Jan. 1, 2001, pp. 1638-1639.
Lawrence N J et al. "Reaction of Baylis-Hillman products with Swern and Dess-Martin oxidants", Tetrahedron Letters, Pergamon, GB, vol. 42 No. 23 dated Jun. 4, 2001, pp. 3939-3941.
Juliana Vale et al. "Efficient [alpha]-Methylenation of Carbonyl Compounds in Ionic Liquids at Room Temperature", SYNLETT, vol. 2009, No. 01, Jan. 1, 2009 (Jan. 1, 2009), pp. 75-78, XP055170349, ISSN: 0936-5214, DOI: 10.1055/s-0028-1087389 *table 2; compound 3 *.
Weiss et al. Miniemulsion Polymerization as a Means to Encapsulate Organic and Inorganic Materials, Adv. Polymer Science, 2010, pp. 1-52, DOI:10.1007/12_2010_61.
Bhatia, Encapsulation of Particles Using Brittle Subterranean Applications, Thesis submitted to College of Engineering and Mineral Resources at West Virginia University in partial fulfillment of the requirements for the degree of Master of Science in Chemical Engineering, 1999.
McFarland et al, Free Radical Frontal Polymerization with a Microencapsulated Initiator, Macromolecules 2004, vol. 37, pp. 6670-6672.
International Search Report (ISR) and Written Opinion of the Searching Authority in App. No. PCT/US2014/011068 dated as mailed May 12, 2014.
International Search Report (ISR) and Written Opinion of the Searching Authority in App. No. PCT/US2011/056903 dated as mailed Jun. 7, 2012.
International Search Report (ISR) and Written Opinion of the Searching Authority in App. No. PCT/US2011/056926 dated as mailed Feb. 28, 2012.
International Search Report (ISR) and Written Opinion of the Searching Authority in App. No. PCT/US2012/060830 dated as mailed Feb. 1, 2013.
International Search Report (ISR) and Written Opinion of the Searching Authority in App. No. PCT/US2012/060840 dated as mailed Mar. 12, 2013.
International Search Report (ISR) and Written Opinion of the Searching Authority in App. No. PCT/US2012/060837 lated as mailed Jan. 9, 2013.
International Search Report (ISR) and Written Opinion of the Searching Authority in App. No. PCT/US2013/034636 dated as mailed Jun. 20, 2013.
International Search Report (ISR) and Written Opinion of the Searching Authority in App. No. PCT/US2013/034641 dated as mailed Jun. 25, 2013.
International Search Report (ISR) and Written Opinion of the Searching Authority in App. No. PCT/US2013/034649 dated as mailed Aug. 27, 2013.
International Search Report (ISR) and Written Opinion of the Searching Authority in App. No. PCT/US2013/043711 dated as mailed Nov. 22, 2013.
International Search Report (ISR) and Written Opinion of the Searching Authority in App. No. PCT/US2013/070355 dated as mailed Mar. 19, 2014.
International Search Report (ISR) and Written Opinion of the Searching Authority in App. No. PCT/US2013/072203 dated as mailed Apr. 18, 2014.
U.S. Appl. No. 14/948,734, filed Nov. 23, 2015.
U.S. Appl. No. 15/094,705, filed Apr. 8, 2016.
Bachman et al.: "Diethyl methylenemalonate", May 17, 1939, Eastman Kodak Company, pp. 493-501.
P. Breton et al., "New Poly(Methylidene Malonate 2.1.2) Nanoparticles: Recent Developments", Targeting of Drugs 4, NATO ASI Series, vol. 273, pp. 161-172, 1994.
Limouzin et al., "Anionic Polymerization of n-Butyl Cyanoacrylate in Emulsion and Miniemulsion" Macromolecules, vol. 36, 2003, pp. 667-674.
"Knoevenagel reaction on a molecular sieve", Li Qifang et al., Chinese Science Bulletin, vol. 12, pp. 914-917.
"Knoevenagel Condensation Over Acidic Zeolite", Zuo Bojun et al., Chinese Journal of Catalysis, vol. 23 (6), pp. 555-558.
"Comparison of the catalytic activity of MOFs and zeolites in Knoevenagel condensation", Maksym Opanasenko, et al., Catalysis Science & Technology, vol. 3 p. 500-507.
Corey et al. "Total Synthesis of Gibberellic Acid. A Simple Synthesiss of a Key Intermediate", J. Am. Chem. Soc. 1982, 104, 6129-6130.
Krishna et al. "Stereodefined Access to 3-Deoxy Sugars Through a Tandem Baylis-Hillman and Lewis Acid Catalyzed Reaction Sequence", European Journal of Organic Chemistry, 2010, 813-817.
International Search Report (ISR) and Written Opinion of the Searching Authority in App No. PCT/US2016/027134 dated as mailed Jul. 15, 2016, 7 pages in its entirety.
International Search Report (ISR) and Written Opinion of the Searching Authority in App No. PCT/US2016/027099 dated as mailed Jul. 15, 2016, 8 pages in its entirety.

* cited by examiner

ELECTROINITIATED POLYMERIZATION OF COMPOSITIONS HAVING A 1,1-DISUBSTITUTED ALKENE COMPOUND

REFERENCE TO RELATED APPLICATIONS

This application is a continuation of U.S. patent application Ser. No. 14/727,285 entitled ELECTROINITIATED POLYMERIZATION OF COMPOSITIONS HAVING A 1,1-DISUBSTITUTED ALKENE COMPOUND, filed Jun. 1, 2015, now issued as U.S. Pat. No. 9,217,098, and hereby incorporates the same application herein by reference in its entirety.

TECHNICAL FIELD

The present disclosure generally relates to systems and methods to initiate polymerization of compositions including a 1,1-disubstituted alkene compound without the addition of a polymerization initiator using electroinitiation.

BACKGROUND

Polymerizable compositions are useful components in a number of applications and products and can be used, for example, as an adhesive, a coating, a sealant, a molding, a film, or as a composite binder. Known polymerizable compositions, however, have suffered from the need to use external polymerization initiators to initiate polymerization. Such use of polymerization initiators, however, has a number of drawbacks. For example, polymerization initiators cannot be removed after polymerization and remain in the cured composition affecting various attributes of the cured composition. Additionally, systems with external polymerization initiators are difficult to control. It would therefore be advantageous to provide a polymerizable system that can be easily cured on a variety of substrates without the addition of a polymerization initiator while retaining excellent mechanical properties.

SUMMARY

According to one embodiment, an electropolymerizable composition includes one or more 1,1-disubstituted alkene compounds, one or more acid stabilizers, and one or more free radical stabilizers. The one or more acid stabilizers and the one or more free radical stabilizers are included in a ratio of about 10:100 parts-per million ("ppm") to a ratio of about 10:1,000 ppm or more.

According to another embodiment, an electropolymerizable composition includes one or more 1,1-disubstituted alkene compounds and one or more conductive synergists. The one or more conductive synergists are selected from the group including a metal, a conductive inorganic material, a conductive polymer, an organic material, a metalloid material, a composite material, and an ionic compound.

According to another embodiment, an electropolymerizable composition includes diethyl methylene malonate, carbon black, ammonium trifluoromethanesulfonate, vinyl chloride terpolymer, fumed silica, methanesulfonic acid ("MSA"), and mono methyl ether of hydroquinone ("MeHQ").

DETAILED DESCRIPTION

As will be appreciated, polymerizable systems that can be cured on-demand without a polymerization initiator can be used in many applications where initiator-cured systems that require an external initiator are either unusable or undesirable. Such initiator-cured systems can refer to systems that require an additional component, external to the system, to initiate curing. In contrast, polymerizable systems that can be cured without a polymerization initiator can refer to systems that can undergo polymerization without the introduction, or contact, of any additional components external to the system using instead, for example, anions generated in the polymerizable composition.

Certain initiator-cured systems are disadvantageous because they are two-part polymerization systems. Two-part polymerization systems generally refer to polymerization systems that require the addition of at least a second component to the system to initiate polymerization.

Addition-type polymerization systems are examples of a two-part polymerization system. Generally, such systems are disadvantageous as a result of the cost and environmental hazards of the initiator components, the energy and time required to mix the initiator components into the polymerizable composition, the time-sensitive application and use of the mixed system, and the continued presence of the initiator components in the cured composition. For example, addition-type acrylate and methacrylate systems require the discrete addition of a relatively large quantity (e.g., about 2% or more) of various initiator components and catalysts into a polymerizable composition to induce polymerization. In such systems, the relatively large quantity of initiator compounds must be meticulously mixed into the system and remain in the cured composition often compromising performance properties. These disadvantages are a fundamental consequence of two-part polymerization systems and cannot be alleviated by using techniques such as substrate priming or improved initiators.

Other initiator-cured systems include moisture curing systems, such as cyanoacrylate systems, that can be cured upon contact with water or moisture. Although sometimes classified as one-part systems by industry standards, such moisture-sensitive systems suffer from several consequences as a result of using an external initiator. For example, moisture-sensitive curing systems are difficult to control due to their rapid polymerization upon contact with commonly found surface moisture, which can vary widely in concentration both substrate to substrate and with seasonal atmospheric humidity. As such, they are unsuitable for use in certain applications such as those pertaining to various inorganic and/or acidic substrates. Additionally, cyanoacrylates also suffer from fairly limited physical and performance versatility. Attempts to improve cyanoacrylate systems through the addition of primers or additives have increased the complexity of use, as well as the expense of such systems.

A polymerizable system that can be cured without the addition of an external polymerization initiator, such as a system that can be cured with pressure or electricity, can avoid these issues and can be used in a wide range of applications that are unsuitable for initiator-cured polymerization systems. For example, a polymerization system that can be cured without an external polymerization initiator can have improved stability and/or durability from the removal of the initiator in the cured system as well as improved usability by eliminating the addition and mixing steps necessary for secondary ex situ initiator-cured systems.

A polymerizable composition that can be cured without the addition of a polymerization initiator can generally be formed of one or more electroinitiatable compounds. Advantageously, such compositions can be cured without the addition of a polymerization initiator by instead passing an electrical charge through the composition to initiate polymerization.

According to certain embodiments, suitable electroinitiatable compounds can be 1,1-disubstituted alkene compounds having two carbonyl groups bonded to the 1 carbon and a hydrocarbyl group bonded to each of the carbonyl groups ("hereinafter 1,1-disubstituted alkene compounds"). In such 1,1-disubstituted alkene compounds, the hydrocarbyl groups can be bonded to the carbonyl groups directly or through an oxygen atom.

According to certain embodiments, suitable hydrocarbyl groups can include at least straight or branched chain alkyl groups, straight or branched chain alkyl alkenyl groups, straight or branched chain alkynyl groups, cycloalkyl groups, alkyl substituted cycloalkyl groups, aryl groups, aralkyl groups, and alkaryl groups. Additionally, suitable hydrocarbyl groups can also contain one or more heteroatoms in the backbone of the hydrocarbyl group.

In certain embodiments, a suitable hydrocarbyl group can also, or alternatively, be substituted with a substituent group. Non-limiting examples of substituent groups can include one or more alkyl, halo, alkoxy, alkylthio, hydroxyl, nitro, cyano, azido, carboxy, acyloxy, and sulfonyl groups. In certain embodiments, substituent groups can be selected from one or more alkyl, halo, alkoxy, alkylthio, and hydroxyl groups. In certain embodiments, substituent groups can be selected from one or more halo, alkyl, and alkoxy groups.

In certain embodiments, suitable hydrocarbyl groups can be $C_{1-20}$ hydrocarbyl groups. For example, the hydrocarbyl group can be an alkyl ether having one or more alkyl ether groups or alkylene oxy groups. Suitable alkyl ether groups can include, without limitation, ethoxy, propoxy, and butoxy groups. In certain embodiments, suitable hydrocarbyl groups can contain about 1 to about 100 alkylene oxy groups; in certain embodiments, about 1 to about 40 alkylene oxy groups; and in certain embodiments, about 1 to about 10 alkylene oxy groups. In certain embodiments, suitable hydrocarbyl groups can contain one or more heteroatoms in the backbone.

Suitable examples of more specific hydrocarbyl groups can include, in certain embodiments, $C_{1-15}$ straight or branched chain alkyl groups, $C_{1-15}$ straight or branched chain alkenyl groups, $C_{5-18}$ cycloalkyl groups, $C_{6-24}$ alkyl substituted cycloalkyl groups, $C_{4-18}$ aryl groups, $C_{4-20}$ aralkyl groups, and $C_{4-20}$ alkaryl groups. In certain embodiments, the hydrocarbyl group can more preferably be $C_{1-8}$ straight or branched chain alkyl groups, $C_{5-12}$ cycloalkyl groups, $C_{6-12}$ alkyl substituted cycloalkyl groups, $C_{4-18}$ aryl groups, $C_{4-20}$ aralkyl groups, or $C_{4-20}$ alkaryl groups.

As used herein, alkaryl can include an alkyl group bonded to an aryl group. Aralkyl can include an aryl group bonded to an alkyl group. Aralkyl can also include alkylene bridged aryl groups such as diphenyl methyl or propyl groups. As used herein, aryl can include groups containing more than one aromatic ring. Cycloalkyl can include groups containing one or more rings including bridge rings. Alkyl substituted cycloalkyl can include a cycloalkyl group having one or more alkyl groups bonded to the cycloalkyl ring.

In certain embodiments, suitable alkyl groups can include methyl, ethyl, propyl, isopropyl, butyl, tertiary butyl, pentyl, hexyl, and ethyl hexyl. Similarly, examples of suitable cycloalkyl groups can include cyclohexyl and fenchyl and examples of suitable alkyl substituted groups can include menthyl and isobornyl.

According to certain embodiments, suitable hydrocarbyl groups can include methyl, ethyl, propyl, isopropyl, butyl, tertiary butyl, ethyl pentyl, hexyl, ethyl hexyl, fenchyl, menthyl, and isobornyl groups.

In certain embodiments, illustrative examples of 1,1-disubstituted alkene compounds can include methylene malonate compounds, methylene β-ketoester compounds, methylene β-diketone compounds, dialkyl disubstituted vinyl compounds, dihaloalkyl disubstituted vinyl compounds and any monofunctional, difunctional, or multifunctional monomers, oligomers, or polymers thereof. Compositions having one or more of such illustrative example compounds can be used as a suitable electroinitiatable composition according to certain embodiments.

Compositions having a 1,1-disubstituted alkene compound can have a variety of properties that make them particularly suitable for use in electroinitiatable polymerizable systems. For example, a composition having a 1,1-disubstituted alkene compound can be polymerized from an electrical source without the use of a solvent under ambient temperatures (e.g. at about room temperature or about 23° C.). Additionally, a composition having a 1,1-disubstituted alkene compound can exhibit water tolerance, be transparent in both cured and uncured states, and have excellent adhesion properties and cure times.

In certain embodiments, a 1,1-disubstituted alkene compound included in a suitable composition can be monofunctional, difunctional, or multifunctional. Monofunctional compounds can refer to monomers that have a single addition polymerizable group. Difunctional compounds can refer to monomers, oligomers, resins, or polymers that contain two addition polymerizable groups. Multifunctional compounds can refer to any monomer, oligomer, resin, or polymer that contains three or more addition polymerizable groups. In contrast to monofunctional compounds, difunctional compounds and multifunctional compounds can undergo additional crosslinking, chain-extension, or both, when polymerized.

An illustrative example of a monofunctional 1,1-disubstituted alkene compound is depicted by general formula I:

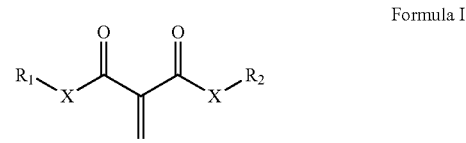

Formula I wherein each X can independently be O or a direct bond and $R_1$ and $R_2$ can be the same or different and can each represent a hydrocarbyl group.

An illustrative example of a multifunctional monomer having more than one methylene group connected by a multivalent hydrocarbyl group can be depicted by general formula II:

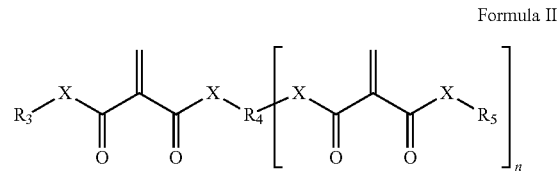

Formula II wherein each X can independently be O or a direct bond; $R_3$ and $R_5$ can be the same or different and can each represent a hydrocarbyl group; $R_4$ can be a hydrocarbyl group having n+1 valences; and n is an integer of 1 or greater. In certain embodiments, n can be 3 or fewer; and in certain embodiments, n can be 2 or fewer.

According to certain embodiments, specific examples of suitable polymerizable compositions can include methylene malonate compounds having general formula III:

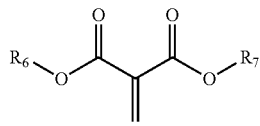

Formula III wherein $R_6$ and $R_7$ can be the same or different and can each represent a hydrocarbyl group. For example, in certain more specific embodiments, suitable methylene malonate compounds can include one or more of diethyl methylene malonate ("DEMM"), dimethyl methylene malonate ("DMMM" or "D3M"), hexyl methyl methylene malonate ("HMMM"), ethylethoxy ethyl methylene malonate ("EE-OEMM"), fenchyl methyl methylene malonate ("FMMM"), dibutyl methylene malonate ("DBMM"), di-n-propyl methylene malonate, di-isopropyl methylene malonate, and dibenzyl methylene malonate. Additionally, in certain embodiments, certain transesterification reaction products formed from the reaction of methylene malonate compounds with acetates, diacetates, alcohols, diols, and polyols can also be used to form a suitable polymerizable composition.

According to certain embodiments, examples of suitable methylene beta ketoesters can be represented by general formula IV:

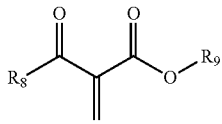

Formula IV wherein $R_8$ and $R_9$ can be the same or different and can each represent a hydrocarbyl group.

According to certain embodiments, examples of suitable methylene beta diketones can be represented by general formula V:

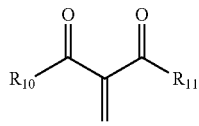

Formula V wherein $R_{10}$ and $R_{11}$ can be the same or different and can each represent a hydrocarbyl group.

Additional details and methods of making suitable 1,1-disubstituted alkene compounds as well as other suitable compositions are disclosed in U.S. Pat. No. 8,609,885; U.S. Pat. No. 8,884,051; and WO 2014/110388 each of which are hereby incorporated by reference.

According to certain embodiments, polymerization of a composition including a 1,1-disubstituted alkene compound can be initiated by passing an electrical charge through the composition. Such initiation offers a number of benefits over traditional curing methods as it does not require the addition of any initiators or other compounds into the system to initiate curing or require mixing. Additionally, polymerization of a composition including a 1,1-disubstituted alkene compound can be directly initiated without dissolving or solubilizing the compositions in a solvent. This eliminates the need to remove a solvent after polymerization.

Generally, an electrical charge can be provided to initiate polymerization of a composition having a 1,1-disubstituted alkene compound in any suitable manner including the conductance of current through the composition, the generation of an electrical potential using an electrochemical process, or by directing an electron beam at the composition. In each such method, electrons from the provided electrical charge can act as a nucleophilic initiator to initiate polymerization of the electrophilic 1,1-disubstituted alkene compounds in the composition.

In certain such embodiments, an electrical charge can generally be provided until polymerization is initiated. For example, in certain embodiments, polymerization can be initiated by providing an electrical charge for a relatively short amount of time and can then be discontinued or removed. In certain embodiments applying direct current of about 30 volts and about 10 amps, electric current can be provided to the polymerizable composition for about 30 minutes or more; for about an hour or more in certain embodiments; for about 4 hours or more in certain embodiments; and for about 8 hours or more in certain embodiments. Electric current can, in certain embodiments, also continue to be provided even after polymerization is initiated.

In certain embodiments that initiate polymerization by passing an electrical charge through a polymerizable composition having a 1,1-disubstituted alkene compound, the electrical charge can be provided in any of several suitable manners. For example, electrical charge can be passed through such a composition using one or more of an electrode, a substrate, or an indirectly applied electric field such as an electrical arc. In certain embodiments, any article that is, or can be modified to be, conductive can be used. For example, an electrical charge can be provided by one or more of a metal article, a conductive polymeric article, or an article with embedded electrodes. Specific examples of suitable materials useful in the construction of conductive articles can include noble metals, steel, stainless steel, aluminum, copper, nickel, metal alloys, metal oxides, graphite, carbonized materials, conductive polymers, polymer composites containing conductive materials, and combinations thereof.

A suitable electrical charge (i.e., electrical current) can be direct current ("DC"), alternating current ("AC"), potentiodynamic, potentiostatic, pulsed, or chronoamperometric according to certain embodiments. Selection of a particular electric current can vary depending on factors such as the qualities of the desired polymerized system as well as the system used to generate the current. For example, in certain embodiments, extremely high voltages can be used which can sometimes necessitate the use of a pulsed current. Generally, a wide range of voltages and amperages can be suitable to initiate polymerization with only minor differences in set time. In certain embodiments, direct current of about 30 volts or more can be used to initiate polymerization; in certain embodiments, direct current of about 100 volts or more can be used to initiate polymerization; in certain embodiments, direct current of about 200 volts or more can be used to initiate polymerization; in certain embodiments, direct current of about 500 volts or more can be used to initiate polymerization; and in certain embodiments, direct current of about 1,000 volts or more can be used to initiate polymerization. Amperages can be about 1 amp or more in certain embodiments, about 2 amps or more in certain embodiments, about 3 amps or more in certain embodiments, about 5 amps or more in certain embodiments, or about 10 amps or more in certain embodiments. Set time, as used herein, is defined as the ability of an adhesive composition to withstand a shear force of 0.2 N/mm$^2$ for 10 seconds or more.

Conductive articles used to provide the electrical current can be advantageously produced in both a variety of shapes and with a variety of mechanical qualities. For example, suitable substrates and electrodes can be provided in shapes that would be difficult to polymerize with polymerization systems requiring an external polymerization initiator such as, for example, 3D-printed parts, certain mechanical parts, and portions of machines and systems. The elimination of an external polymerization initiator can instead allow for a one-part application of the composition having a 1,1-disubstituted alkene compound and subsequent curing of the composition. For example, in certain embodiments, a coating layer can be applied to a curved metallic part such as an automobile frame and then cured without time constraints imposed by any included polymerization initiators or alternatively without the need to subsequently supply any initiators. As can be further appreciated, certain existing manufacturing processes can already be equipped for the application of electrical current which further enhances the utility of electroinitiatable polymerization. Mechanically, certain conductive articles can be supplied that demonstrate a variety of beneficial properties including, for example, transparently and flexibility.

In certain embodiments, a combination of more than one substrate or electrode can be utilized. For example, when a composition having a 1,1-disubstituted alkene compound is used as an adhesive to adhere two substrates together, it can be advantageous for the two substrates to both be conductive substrates and to pass the electrical current between them. However, other systems can also be used. For example, a composition having a 1,1-disubstituted alkene compound can be applied to a conductive substrate and an electrode or electric arc can be used to pass electricity through the composition to the conductive substrate. The electrode or electric arc can then be removed leaving, for example, a polymerized coating layer on the substrate.

In certain embodiments, an electrochemically induced electric charge can be used to initiate polymerization of a composition having a 1,1-disubstituted alkene compound. For example, an oxidation-reduction ("redox") reaction can be used in certain embodiments to initiate polymerization. According to certain embodiments, suitable electrochemical materials can either be suspended in a composition having a 1,1-disubstituted alkene compound, or can be provided as part of a substrate. For example, a suitable substrate can form half of an electrochemical cell. In such embodiments, the second half-cell can then be dispersed in the composition or can be provided by a second substrate. In certain such embodiments, polymerization can be initiated substantially upon contact of a composition having a 1,1-disubstituted alkene compound onto the substrate without the need for an external power source.

In other certain embodiments, electrons can be directly provided to a composition including a 1,1-disubstituted alkene compound to initiate polymerization using, for example, an electron beam provided by an electron gun.

Generally, electroinitiated polymerization of a composition including a 1,1-disubstituted alkene compound can proceed through living anionic polymerization. As can be appreciated, living anionic polymerization is a process by which nucleophilic species initiate addition reactions with an electrophilic double or triple bond. Living anionic polymerization is not self-terminating and can proceed until quenched or until all of the reactive monomers are consumed.

Initiation of living anionic polymerization can offer a number of benefits. For example, in certain embodiments, complete polymerization of compositions having a 1,1-disubstituted alkene compound can occur even when an electric charge is discontinued or removed before full curing is reached. As illustration, a diethyl methylene malonate composition can be fully polymerized when an electrical current of about 30 volts and about 10 amps is passed through the composition for about 4 hours. The same composition can instead be immediately vicious and only partially polymerized when an identical electrical current is passed through the composition for only about 1 hour. However, after about an additional 3 hours has elapsed, the partially polymerized composition can complete polymerization on its own without requiring any additional electric charge. As used herein, complete or full polymerization can mean that polymerization has proceeded until about 25% or less of the composition remains un-polymerized according to certain embodiments; about 10% or less of the composition remains un-polymerized according to certain embodiments; about 5% or less of the composition remains un-polymerized according to certain embodiments; or about 3% or less of the composition remains un-polymerized according to certain embodiments. When used as an adhesive, cure time can mean that 75% or more of the composition has been polymerized. Once the cure time has been reached, the polymerized composition can exhibit maximum mechanical strength properties.

Continued polymerization after initiation can allow for increased flexibility in manufacturing processes or can allow for the removal, or addition, of the 1,1-disubstituted alkene composition after polymerization has been initiated.

In certain embodiments, an additional benefit of living anionic polymerization is the ability to quench polymerization before complete polymerization has occurred. For example, after polymerization has been initiated by providing an electric charge, a weak acid can be added to the composition to quench any additional polymerization. Quenching can allow for excess composition to be removed or can allow for the formation of weaker polymeric matrixes for targeted and consistent failure modes.

The molecular weight and the molecular weight distribution of a living anionic polymerization can also be influenced. For example, in certain embodiments, the molecular weight and molecular weight distribution can be influenced by modifying the method and materials used to initiate the polymerization. A pulsed electrical current can, for example, initiate multiple polymerization chains, each initiated at different time points by different pulses of the electric current. Each of the polymerization chains can then have different lengths. As such, the molecular weight and the molecular weight distribution can be varied by modifying the pulse rate. Additionally, or alternatively, the size and shape of the conductive article and/or the composition having a 1,1-disubstituted alkene compound can also influence the quantity and/or relative density of any polymerization chains initiated.

In certain embodiments, a composition including a 1,1-disubstituted alkene compound can additionally be electrografted to a suitable substrate. Electrografting, a form of substrate surface modification, generally refers to an electrochemical reaction that permits organic materials to be covalently attached to a suitable conductive substrate. Typically such conductive substrates are metal. Electrografting can also refer to reactions involving an electron transfer between the conductive substrate and the reagent. The present electrografting reactions can generally refer to covalent bonding of a composition having a 1,1-disubstituted alkene compound to a substrate. Such electrografting can generally be indicated by a change in the mechanical performance properties and substrate bonding failure modes. For example, after electrografting, the substrate bonding failure mode can switch to a cohesive-type tensile shear and impact failure mode from an adhesive-type failure mode. Due to challenges in surface analysis of chemical bonding, mechanical property measurements, such as tensile shear strength and impact resistance are commonly used to evaluate the effects of electrografting. For example, electrografting can result in increased impact resistance as a consequence of improved surface adhesion and overall adhesive bonding strength.

Generally, compositions including 1,1-disubstituted alkene compounds can be electrografted to a substrate by increasing the duration of electrical exposure beyond the time necessary to initiate polymerization. For example, a composition including a diethyl methylene malonate compound can be electrografted to a cold-rolled steel substrate by conducting a 30 volt, 10 amp electrical current for about 8 hours. The same composition can reach full polymerization under identical conditions in only about 4 hours but without electro grafting. Generally, a composition including a 1,1-disubstituted alkene compound can be electrografted to any substrate that supports covalent bonds to a 1,1-disubstituted alkene compound including, for example, steel, aluminum, copper, and nickel substrates.

In certain embodiments, a composition having a 1,1-disubstituted alkene compound can include one or more additives including, for example, one or more dyes, pigments, toughening agents, impact modifiers, rheology modifiers, plasticizing agents, natural or synthetic rubbers, filler agents, reinforcing agents, thickening agents, opacifiers, inhibitors, fluorescence markers, thermal degradation reducers, thermal resistance conferring agents, surfactants, wetting agents, conductive synergists, or stabilizers. For example, thickening agents and plasticizers such as vinyl chloride terpolymer and dimethyl sebacate respectively, can be used to modify the viscosity, elasticity, and robustness of a system. Additives can additionally provide mechanical reinforcement to the polymerized system.

According to certain embodiments, stabilizers can be included in compositions having a 1,1-disubstituted alkene compound to increase and improve the shelf life of the composition and to prevent spontaneous polymerization of the system. Generally, one or more anionic polymerization inhibitors such as liquid phase stabilizers (e.g., methanesulfonic acid ("MSA")), vapor phase stabilizers (e.g., trifluoroacetic acid ("TFA")), or free radical stabilizers (e.g., 4-methoxyphenol or mono methyl ether of hydroquinone ("MeHQ")) can be used as a stabilizer package as disclosed in U.S. Pat. No. 8,609,885 and U.S. Pat. No. 8,884,051, each incorporated by reference. Additional free radical polymerization inhibitors are disclosed in U.S. Pat. No. 6,458,956, and are hereby incorporated by reference. Anionic polymerization stabilizers are generally electrophilic compounds that scavenge electrons from the composition or growing polymer chain. The use of anionic polymerization stabilizers can terminate additional polymer chain propagation. Generally, only minimal quantities of a stabilizer are needed and, in certain embodiments only about 150 parts-per-million ("ppm") or less can be included. In certain embodiments, a blend of multiple stabilizers can be included such as, for example, a blend of about 10 ppm MSA and 100 ppm MeHQ.

According to certain embodiments, the inclusion of one or more conductive synergists into a composition including a 1,1-disubstituted alkene compound can reduce the time needed to initiate polymerization of the composition. A composition including a diethyl methylene malonate compound substantially free of any additives and used as an adhesive can have a set time of about 120 minutes when exposed to electrical current of about 30 volts and about 10 amps. The addition, however, of about 1% to about 2% of a conductive carbon black to the composition having a diethyl methylene malonate compound can reduce the set time to about 45 minutes. Alternatively, the addition of a similar quantity of a conductive synergist, tetrabutylammonium bromide ("TBAB") can reduce the set time to only about 5 minutes.

In certain embodiments, a suitable conductive synergist can include any non-nucleophilic conductive material such as a metal, a conductive inorganic material, a conductive polymer, an organic material, a metalloid material, a composite material, or an ionic compound. For example, a suitable conductive synergist can be a quaternary ammonium salt such as TBAB or a phosphonium salt. As can be appreciated, a suitable conductive synergist can also have other beneficial properties. For example, a suitable conductive synergist can also act as a stabilizer and can be, for example, MSA or MeHQ. Compositions including a conductive synergist can generally include such conductive synergists in any quantity that does not impair the mechanical properties of the composition. For example, conductive synergists can, in certain embodiments, be included at about 50% or less of the composition, in certain embodiments be included at about 10% or less of the composition, and in certain embodiments be included at about 1% to about 2% of the composition.

Additives such as conductive synergists are not required components. For example, in certain embodiments, substantially no conductive synergists can be included. Additionally, in certain embodiments, a composition having a 1,1-disubstituted alkene compound can also include substantially no conductive synergist or any other additives. As can be appreciated, the strength and other physical properties such as opacity can be influenced by any included additives.

Combinations of certain additives can also have a synergistic improvement on the polymerization time and/or the initiation time. For example, in certain compositions having a 1,1-disubstituted alkene compound and further including MSA and MeHQ as stabilizers, improved cure times can be observed when the stabilizers are included in relatively large ratios. As illustration, a composition including diethyl methylene malonate and about 10 ppm MSA and about 1,000 ppm MeHQ can unexpectedly cure much faster than a composition having diethyl methylene malonate and smaller ratios of MSA and MeHQ. According to certain embodiments, the synergistic benefit can occur when the ratio of MSA to MeHQ is about 10:1,000 ppm or more. Similar synergistic benefits can be achieved through the pairing of other acid stabilizers and free radical stabilizers, such as a pairing of maleic acid and 1-acetyl-2-phenylhydrazine or trifluoromethanesulfonic acid and butylated hydroxytoluene. Substitution of MSA and MeHQ with alternative acid and free radical stabilizers can be useful in the tailoring of certain properties (such as surface adhesion) to manufacturing requirements or regulations.

In systems incorporating MSA and MeHQ, or other acid and free radical stabilizers, in synergistic ratios, additional conductive synergists can also be added. For example, one or more of carbon black, graphite, graphene, silver, TBAB, ammonium trifluoromethanesulfonate ("ATFMS"), and ammonium sulfonate ("AS") can also be added with functional stability. The use of additional conductive synergists can decrease the set time of the system and improve the ability of the cured system to withstand thermal and/or moisture cycling.

agents and oxidizing agents, such as hydroperoxides, can be suitable for inclusion in the polymerizable compositions. Specific examples of suitable chelating agents can include crown ethers, calixarenes, cyclodextrins, and polyethylene glycols. A specific example of an oxidizing agent can include cumene hydroperoxide. A suitable chelating agent, or oxidizing agent, can be added in quantities of about 3% or less, by weight, according to certain embodiments; or at quantities of about 1% or less, by weight, according to certain embodiments.

EXAMPLES

Table 1 depicts Examples 1 to 3. Examples 1 to 3 evaluate the polymerization time of sample compositions that initiate with a 30 volt, 10 amp DC current on a cold-rolled steel substrate. Examples 1 to 3 are each diethyl methylene malonate compositions containing no additives. In Example 1, current is provided for 1 hour. In Example 2, current is provided for 4 hours. In Example 3, current is provided for 8 hours.

TABLE 1

| Polymerization at: | Example 1 (Current provided for 1 hour) | Example 2 (Current provided for 4 hours) | Example 3 (Current provided for 8 hours) |
|---|---|---|---|
| 1 hour | Viscous - incomplete polymerization | Viscous - incomplete polymerization | Viscous - incomplete polymerization |
| 4 hours | Fully polymerized | Fully polymerized | Fully polymerized |
| 8 hours | Fully polymerized | Fully polymerized | Electrografted |

The use of acid and free radical stabilizers also provides support for the determination of an anionic polymerization mechanism. Specifically, an anionic polymerization mechanism is suggested from the observation that cure times are notably extended by elevated quantities of acidic stabilizer. Acidic stabilizers are incorporated to inhibit premature anionic polymerization. However, if present in excess, acid stabilizers can also precipitately quench propagating polymer chains under electropolymerizable conditions. Such early termination would lead to longer cure times or prevent the curing process entirely. An anionic polymerization mechanism is further supported by the observation that a free radical polymerization mechanism was not observed. A free radical polymerization mechanism would have been suggested by an increase in cure time as elevated quantities of free radical stabilizers were included in sample compositions. In free radical polymerizations, free radical stabilizers cause an increase in cure time by both terminating chain growth and preventing initiation of polymerization. Shorter cure times were instead observed in compositions incorporating a free radical stabilizer at higher concentrations and acidic stabilizers at lower concentrations suggesting that the polymerization was not free radical in nature.

According to certain embodiments, chelating agents can also be added to a composition having a 1,1-disubstituted alkene compound. The inclusion of such chelating agents can be useful in a variety of roles and can act, for example, as a metal scavenger, moisture scavenger, synergistic initiation additive, polymerization additive, and/or as a surface compatibility agent. For example, a chelating agent may be useful to remove surface or substrate impurities and can allow for initiation and bonding to a wider range of such surfaces and substrates. Generally, any class of chelating agent can be suitable for inclusion provided the chelating agent does not induce polymerization of the 1,1-disubstituted alkene compound. For example, nonionic chelating As depicted in Table 1, each of Examples 1 to 3 reach full polymerization 4 hours after initiation despite Example 1 discontinuing the application of electrical current after only 1 hour. Additionally, as depicted by Example 3, electrografting of the composition to the substrate is achieved after passing electrical current through the composition for 8 hours.

Electrografting is further evaluated in Table 2, which depicts various properties of a diethyl methylene malonate composition before and after electrografting. The measured properties include tensile shear strength (psi), impact resistance ($J/in^2$), and the tensile shear and impact failure modes. Electrografting is evidenced by cohesive failure instead of adhesive failure accompanied with improvements in mechanical strength. Impact resistance was measured using a pendulum apparatus where the maximum possible impact resistance is 6.78 $J/in^2$. Example 4 was evaluated at 1 hour of applied electrical current; Example 5 at 2 hours of applied electrical current; Example 6 at 4 hours of applied electrical current; and Example 7 at 8 hours of applied electrical current.

TABLE 2

| Performance Property | Example 4 | Example 5 | Example 6 | Example 7 |
|---|---|---|---|---|
| Tensile Shear Strength (psi) | 1091 ± 199 | 1164 ± 134 | 1272 ± 118 | 1898 ± 188 |
| Impact Resistance ($J/in^2$) | 0 | 0 | 3.8 ± 0.6 | 6.5 ± 0.2 |
| Failure Mode (Tensile Shear/Impact) | Adhesive/ Adhesive | Adhesive/ Adhesive | Mixed/ Mixed | Cohesive/ Cohesive |

As depicted in Table 2, Examples 6 and 7 show the diverging properties of electrografting. Specifically, Examples 6 and 7 show a change in the failure modes and in impact resistance.

Table 3 depicts the effect voltage and amperage have on the set time of a diethyl methylene malonate composition with 10 ppm MSA and 1,000 ppm MeHQ as conductive stabilizers. Set times for each of Examples 8 to 12 were evaluated using cold-rolled steel lap shears and are measured in minutes. Example 8 has an amperage of 1 amp; Example 9 an amperage of 2 amps; Example 10 an amperage of 3 amps; Example 11 an amperage of 4 amps; and Example 12 an amperage of 5 amps.

TABLE 3

| Voltage | Example 8 - 1 Amp | Example 9 - 2 Amps | Example 10 - 3 Amps | Example 11 - 4 Amps | Example 12 - 5 Amps |
| --- | --- | --- | --- | --- | --- |
| 100 Volts | 60 | 50 | 45 | 45 | 45 |
| 500 volts | 50 | 45 | 40 | 30 | 30 |
| 1,000 volts | 40 | 35 | 35 | 30 | 30 |

As depicted in Table 3, increases in either the voltage or the current moderately reduces the set time of diethyl methylene malonate.

Table 4 depicts the set times and shear strengths of Examples 13 to 16. Each of Examples 13 to 16 are compositions having diethyl methylene malonate and varying amounts of additives. Examples 13 and 14 are compositions which include diethyl methylene malonate without additives. Example 15 includes 1-2% carbon black. Example 16 includes 1-2% TBAB. The set times of Examples 13 to 16 are evaluated by applying 30 volt, 10 amp DC current until the composition is set on a cold-rolled steel substrate. Example 13 is a comparative example and electrical current is not applied.

TABLE 4

| Property | Example 13 | Example 14 | Example 15 | Example 16 |
| --- | --- | --- | --- | --- |
| Set Time | No set time observed after 1 day | 120 minutes | 45 minutes | 5 minutes |
| Tensile Shear Strength 1 Hour after Set Time (psi) | N/A | 442 ± 49 | 899 ± 111 | 924 ± 150 |
| Tensile Shear Strength 24 Hours after Set Time (psi) | N/A | 1148 ± 122 | 1198 ± 143 | 1203 ± 138 |

As depicted in Table 4, Example 13 is comparative because polymerization does not occur. Examples 15 to 16 demonstrate that the addition of conductive synergists decrease the set time of the adhesive formulations.

Table 5 further depicts the effect of additives and purity on the composition curing time. Specifically, Table 5 evaluates the set time of Examples 17 to 21 on an aluminum substrate. Example 17 is a low-purity sample composition having diethyl methylene malonate and conductive impurities as a contaminant. Example 18 is prepared by fractional distillation of Example 17 to produce a composition formed of high-purity diethyl methylene malonate (i.e., greater than 99% reactive monomer). Example 19 is prepared by adding 10 ppm MSA to an aliquot of Example 18. Example 20 is prepared by adding 100 ppm MeHQ to an aliquot of Example 18. Example 21 is prepared by adding 10 ppm MSA and 100 ppm MeHQ to an aliquot of Example 18.

TABLE 5

| Voltage Applied | Example 17 | Example 18 | Example 19 | Example 20 | Example 21 |
| --- | --- | --- | --- | --- | --- |
| No Voltage | No Cure | No Cure | No Cure | No Cure | No Cure |
| 200 volts | 2 hours | 9 hours | 9 hours | 9 hours | 4 hours |
| 500 volts | 1 hour | 8.5 hours | 9 hours | 8 hours | 3 hours |
| 1,000 volts | 0.5 hour | 6 hours | 8 hours | 6 hours | 2 hours |

As depicted in Table 5, Examples 17 and 21, having either conductive impurities or a mixture of stabilizers, were the fastest to reach the set time. The high purity samples (Examples 18 to 20), in contrast, have relatively long set times. Example 21 also demonstrates a synergistic benefit from the inclusion of both MSA and MeHQ.

Table 6 depicts the weight percentage of the components of Example 22. Example 22 demonstrates some of the favorable properties that can be achieved through the inclusion of various additives. For example, Example 22 is thick, exhibiting a viscosity of 1,500 to 2,500 cPs, and has improved sag resistance. Example 22 has a set time of 5 minutes using 100 volt, 1 amp current on cold-rolled steel and has a tensile shear strength at 24 hours of 1,259±88 psi. Example 22 also has improved shelf stability in the uncured state with a predicted life span of more than a year under ambient conditions as evidenced by a 10 day life span at 82° C. Under such elevated temperatures, 6 days is roughly equivalent to a one year life span under ambient conditions. Example 22 is opaque from the inclusion of carbon black.

TABLE 6

| (Example 22) | |
| --- | --- |
| Component | Percentage by weight |
| DEMM | 83.399% |
| Carbon Black | 2.000% |
| Ammonium trifluoromethanesulfonate | 1.000% |
| Vinyl chloride terpolymer | 13.000% |
| Fumed silica | 0.500% |
| MSA | 0.001% |
| MeHQ | 0.100% |

Table 7, including Examples 23 to 29, further depicts the synergistic benefit on cure time made possible by including certain quantities of a conductive synergist. Each of Examples 23 to 29 are prepared by adding varying quantities of MSA and MeHQ to diethyl methylene malonate. Example 23 is prepared by including 10 ppm MSA and 100 ppm MeHQ. Example 24 is prepared by including 10 ppm MSA and 1,000 ppm MeHQ. Example 25 is prepared by including 100 ppm MSA and 100 ppm MeHQ. Example 26 is prepared by including 100 ppm MSA and 1,000 ppm MeHQ. Example 27 is prepared by including 1,000 ppm MSA and 1,000 ppm MeHQ. Example 28 is prepared by including 10 ppm MSA and 5,000 ppm MeHQ. Example 29 is prepared by including 10 ppm MSA and 10,000 ppm MeHQ.

TABLE 7

| | Example 23 | Example 24 | Example 25 | Example 26 | Example 27 | Example 28 | Example 29 |
|---|---|---|---|---|---|---|---|
| Conductive Synergist Quantities | 10 ppm MSA/ 100 ppm MeHQ | 10 ppm MSA/ 1,000 ppm MeHQ | 100 ppm MSA/ 100 ppm MeHQ | 100 ppm MSA/ 1,000 ppm MeHQ | 1,000 ppm MSA/ 1,000 ppm MeHQ | 10 ppm MSA/ 5,000 ppm MeHQ | 10 ppm MSA/ 10,000 ppm MeHQ |
| No Voltage | No Cure | No Cure | No Cure | No Cure | No Cure | No Cure | No Cure |
| 100 volts | ≥240 min. | 45 min. | ≥240 min. | ≥240 min. | ≥240 min. | 40 min. | 30 min. |
| 200 volts | 240 min. | 30 min. | ≥240 min. | ≥240 min. | ≥240 min. | 20 min. | 15 min. |
| 500 volts | 180 min. | 30 min. | ≥240 min. | ≥240 min. | ≥240 min. | 15 min. | 15 min. |
| 1,000 volts | 120 min. | 30 min. | ≥240 min. | ≥240 min. | ≥240 min. | 15 min. | 15 min. |

As depicted in Table 7, certain ratios of MSA and MeHQ contribute to shorter cure times than systems prepared with other ratios. Specifically, Examples 24, 28, and 29, each with a ratio of 10 ppm MSA to 1,000 ppm or more of MeHQ, all show substantially shorter cure times at all voltages than Examples 23, 25, 26, and 27 prepared with other ratios.

Table 8 depicts further systems derived from Example 24. Specifically, Table 8 depicts the performance properties of Examples 30 to 36 which each include diethyl methylene malonate, 10 ppm MSA, 1,000 ppm MeHQ, and an additional conductive synergist. Table 8 depicts the set time, tensile shear strength after curing for 24 hours, tensile shear strength after curing for 24 hours and undergoing thermal and moisture cycling, and impact resistance strength for each of Examples 30-36. Impact resistance is measured on each Example after applying current for 8 hours to cause electrografting to the substrate. Thermal and moisture cycling is performed by placing each sample in an environmental chamber and cycling the sample between a 70° C., 70% relative humidity environment, and a −23° C., 0% relative humidity environment. Ten cycles are performed. Example 24, free of any additional conductive synergist is included for comparative purposes. Each performance property was evaluated using 100 volt, 1 amp electroinitiation on cold-rolled steel lap shears.

tively. Example 39 includes maleic acid as an acid stabilizer and 1-acetyl-2-phenylhydrazine as a free radical stabilizer. Example 40 includes trifluoromethanesulfonic acid as an acid stabilizer and butylated hydroxytoluene as a free radical stabilizer. Each of the Examples were evaluated for set time using cold-rolled steel lap shears and varying voltages.

TABLE 9

| Voltage | Example 37 | Example 38 | Example 39 | Example 40 |
|---|---|---|---|---|
| 100 | >540 | 45 | 40 | 60 |
| 500 | 510 | 30 | 35 | 50 |
| 1,000 | 360 | 30 | 30 | 45 |

As depicted in Table 9, Examples 39 and 40 (each with alternative stabilizers) also demonstrate synergistic polymerization times similar to Example 38 with MSA and MeHQ. Example 37 without any stabilizers demonstrates substantially longer set times.

Example compositions 41 to 45, depicted in Tables 10 and 11, include 1,1-disubstituted alkene monomers other than diethyl methylene malonate. Each of Examples 41 to 45 include 10 ppm MSA and 1,000 ppm MeHQ as conductive stabilizers. Example 41 is comparative and is dimethyl

TABLE 8

| Performance Property | Ex. 24 | Ex. 30 | Ex. 31 | Ex. 32 | Ex. 33 | Ex. 34 | Ex. 35 | Ex. 36 |
|---|---|---|---|---|---|---|---|---|
| Additional Conductive Synergist | N/A | Carbon Black | Graphite | Graphene | Silver | TBAB | ATFMS | AS |
| Set Time (min) | 45 | 25 | 20 | 20 | 20 | 5-10 | 7-11 | 6-12 |
| 24 Hour Tensile Shear Strength (psi) | 1209 ± 99 | 1256 ± 133 | 1159 ± 132 | 1201 ± 78 | 1136 ± 181 | 1117 ± 105 | 1189 ± 129 | 1215 ± 101 |
| Tensile Shear Strength after Cycling (psi) | 893 ± 194 | 1099 ± 115 | 1010 ± 171 | 917 ± 201 | 987 ± 211 | 901 ± 199 | 922 ± 177 | 921 ± 200 |
| Impact Resistance after Current Applied for 8 Hours (J/in$^2$) | 6.5 ± 0.2 | 6.6 ± 0.1 | 6.6 ± 0.1 | 6.5 ± 0.1 | 6.5 ± 0.2 | 6.3 ± 0.3 | 6.2 ± 0.3 | 6.2 ± 0.2 |

As depicted in Table 8, the inclusion of an additional conductive synergist to Example 24 reduced the set time of each of Examples 30 to 36, while also leading to improved tensile shear strength after thermal and moisture cycling. The impact resistance of each of Examples 24 and 30 to 36, however, are near identical after electrografting to the substrate. The impact resistance after electrografting is not influenced by the inclusion, or choice, of a conductive synergist.

Example systems are also produced using stabilizers other than MSA and MeHQ. Table 9 depicts the set time of Examples 37 to 40 which include different stabilization packages. Each of the stabilization packages consists of 10 ppm of an acid stabilizer and 1,000 ppm of a free radical stabilizer. Examples 37 and 38 are comparative and consist of a diethyl methylene malonate composition free of stabilizers and a MSA/MeHQ stabilized composition respecmethylene malonate. Example 42 is fenchyl methyl methylene malonate; Example 43 is methylmethoxy ethyl methylene malonate; Example 44 is hexyl methyl methylene malonate; and Example 45 is dibutyl methylene malonate. Each of Examples 41 to 45 were evaluated on various metal substrates for set time and tensile shear strength in Tables 10 and 11 respectively. Set time is measured in minutes; tensile shear strength in psi.

TABLE 10

| Substrate | Example 41 | Example 42 | Example 43 | Example 44 | Example 45 |
|---|---|---|---|---|---|
| Cold-Rolled Steel | 45 | 240 | 210 | 120 | 180 |
| Stainless Steel | 45 | 240 | 210 | 120 | 210 |

TABLE 10-continued

| Substrate | Example 41 | Example 42 | Example 43 | Example 44 | Example 45 |
|---|---|---|---|---|---|
| Aluminum | 35 | 210 | 195 | 90 | 165 |
| Copper | 30 | 210 | 180 | 90 | 150 |

TABLE 11

| Substrate | Example 41 | Example 42 | Example 43 | Example 44 | Example 45 |
|---|---|---|---|---|---|
| Cold-Rolled Steel | 1251 ± 92 | 947 ± 102 | 451 ± 190 | 655 ± 171 | 351 ± 172 |
| Stainless Steel | 603 ± 193 | 609 ± 297 | 588 ± 188 | 603 ± 157 | 303 ± 113 |
| Aluminum | 348 ± 225 | 448 ± 201 | 548 ± 129 | 778 ± 166 | 378 ± 65 |
| Copper | 1127 ± 112 | 934 ± 208 | 423 ± 155 | 567 ± 82 | 227 ± 122 |

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

It should be understood that certain aspects, features, structures, or characteristics of the various embodiments can be interchanged in whole or in part. Reference to certain embodiments means that a particular aspect, feature, structure, or characteristic described in connection with certain embodiments can be included in at least one embodiment and may be interchanged with certain other embodiments. The appearances of the phrase "in certain embodiments" in various places in specification are not necessarily all referring to the same embodiment, nor are certain embodiments necessarily mutually exclusive of other certain embodiments. It should also be understood that the steps of the methods set forth herein are not necessarily required to be performed in the orders described, and the order of the steps of such methods should be understood to be merely exemplary. Likewise, additional steps can be included in such methods, and certain steps may be omitted or combined, in methods consistent with certain embodiments.

What is claimed is:

1. An electropolymerizable composition comprising:
   one or more 1,1-disubstituted alkene compounds;
   one or more acid stabilizers;
   one or more free radical stabilizers; and
   about 1% to about 2% of one or more conductive synergists, the one or more conductive synergists selected from the group including a metal, a conductive inorganic material, a conductive polymer, an organic material, a metalloid material, a composite material, and an ionic compound; and
   wherein the one or more acid stabilizers and the one or more free radical stabilizers are included in a ratio of about 10:100 parts-per million ("ppm") to a ratio of about 10:1,000 ppm or more.

2. The electropolymerizable composition of claim 1, wherein the one or more 1,1-disubstituted alkene compounds comprise one or more of methylene malonate, methylene β-ketoester, methylene β-diketone, dialkyl disubstituted vinyl, dihaloalkyl disubstituted vinyl, and monofunctional, difunctional, and multifunctional monomers, oligomers, and polymers thereof.

3. The electropolymerizable composition of claim 1, wherein the one more 1,1-disubstituted alkene compounds comprise one or more of diethyl methylene malonate, fenchyl methyl methylene malonate, methylmethoxy ethyl methylene malonate, hexyl methyl methylene malonate, and dibutyl methylene malonate.

4. The electropolymerizable composition of claim 1, further comprising one or more members from the group including dyes, pigments, toughening agents, impact modifiers, rheology modifiers, plasticizing agents, natural or synthetic rubbers, filler agents, reinforcing agents, thickening agents, opacifiers, inhibitors, fluorescence markers, thermal degradation reducers, thermal resistance conferring agents, surfactants, and wetting agents.

5. The electropolymerizable composition of claim 4, wherein the thickening agents and plasticizers comprise one or more of vinyl chloride terpolymer and dimethyl sebacate.

6. The electropolymerizable composition of claim 4, wherein the filler agents comprise fumed silica.

7. The electropolymerizable composition of claim 1 is substantially transparent.

8. The electropolymerizable composition of claim 1 is substantially free of a solvent.

9. The electropolymerizable composition of claim 1 has a viscosity of about 1,500 cPs to about 2,500 cPs.

10. The electropolymerizable composition of claim 1 is configured to cure when exposed to an electrical charge.

11. An electropolymerizable composition comprising:
one or more 1,1-disubstituted alkene compounds; and
about 1% to about 2% of one or more conductive synergists, the one or more conductive synergists selected from the group including a metal, a conductive inorganic material, a conductive polymer, an organic material, a metalloid material, a composite material, and an ionic compound.

12. The electropolymerizable composition of claim 11, wherein the one or more 1,1-disubstituted alkene compounds comprise one or more of diethyl methylene malonate, fenchyl methyl methylene malonate, methylmethoxy ethyl methylene malonate, hexyl methyl methylene malonate, and dibutyl methylene malonate.

13. The electropolymerizable composition of claim 11, wherein the conductive synergist comprises one or more of carbon black, tetrabutylammonium bromide, graphite, graphene, silver, ammonium trifluoromethane sulfonate, and ammonium sulfonate.

14. The electropolymerizable composition of claim 11, wherein the conductive synergist comprises carbon black.

15. The electropolymerizable composition of claim 11, further comprising one or more acid stabilizers and one or more free radical stabilizers, and wherein the one or more acid stabilizers and the one or more free radical stabilizers are included in a ratio of about 10:100 parts-per million ("ppm") to a ratio of about 10:1,000 ppm.

16. An electropolymerizable composition comprising:
diethyl methylene malonate;
carbon black;
ammonium trifluoromethanesulfonate;
vinyl chloride terpolymer;
fumed silica;
methanesulfonic acid ("MSA"); and
mono methyl ether of hydroquinone ("MeHQ").

17. The electropolymerizable composition of claim 16 comprises by weight:
about 83.399% diethyl methylene malonate;
about 2.000% carbon black;
about 1.000% ammonium trifluoromethanesulfonate;
about 13.000% vinyl chloride terpolymer;
about 0.5000% fumed silica;
about 0.001% MSA; and
about 0.100% MeHQ.

18. The electropolymerizable composition of claim 16 has a viscosity of about 1,500 cPs to about 2,500 cPs.

19. The electropolymerizable composition of claim 16 exhibits a substantially black appearance.

* * * * *